United States Patent
Davis

(10) Patent No.: US 9,157,474 B2
(45) Date of Patent: Oct. 13, 2015

(54) SYSTEM AND METHOD OF MONITORING WEAR IN A BEARING

(71) Applicant: Bell Helicopter Textron Inc., Fort Worth, TX (US)

(72) Inventor: Hunter J. Davis, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 107 days.

(21) Appl. No.: 14/041,396

(22) Filed: Sep. 30, 2013

(65) Prior Publication Data
US 2015/0093059 A1    Apr. 2, 2015

(51) Int. Cl.
| | |
|---|---|
| F16C 17/24 | (2006.01) |
| F16C 23/04 | (2006.01) |
| F16C 11/06 | (2006.01) |
| G01M 13/04 | (2006.01) |
| B64C 11/32 | (2006.01) |
| B64C 27/605 | (2006.01) |
| B60B 7/08 | (2006.01) |
| B64D 45/00 | (2006.01) |

(52) U.S. Cl.
CPC ............... *F16C 17/246* (2013.01); *B60B 7/08* (2013.01); *B64C 11/32* (2013.01); *B64C 27/605* (2013.01); *F16C 11/0614* (2013.01); *F16C 11/0647* (2013.01); *F16C 23/043* (2013.01); *G01M 13/04* (2013.01); *B64D 2045/0085* (2013.01)

(58) Field of Classification Search
CPC ............... F16C 11/246; F16C 11/0614; F16C 11/0647; F16C 23/043; B64C 27/32; G01M 13/04

USPC ......... 384/108, 192, 206–209, 211, 216, 261, 384/276, 282, 448; 403/122, 133, 135; 416/134 A; 73/7
See application file for complete search history.

(56) References Cited

U.S. PATENT DOCUMENTS

| | | | | | |
|---|---|---|---|---|---|
| 3,471,207 | A | * | 10/1969 | McCloskey | 384/206 |
| 3,786,695 | A | * | 1/1974 | Barrett, Jr. | 403/43 |
| 4,248,486 | A | * | 2/1981 | Bradley, Jr. | 384/206 |
| 4,657,412 | A | * | 4/1987 | McLarty et al. | 384/447 |
| 4,808,075 | A | * | 2/1989 | Pariani et al. | 416/140 |
| 4,850,719 | A | * | 7/1989 | Moseley et al. | 384/1 |
| 5,730,693 | A | * | 3/1998 | Krayenhagen | 492/16 |

(Continued)

FOREIGN PATENT DOCUMENTS

| | | |
|---|---|---|
| DE | 102005059165 A1 | 6/2007 |
| DE | 102010017530 A1 * | 12/2011 |

(Continued)

OTHER PUBLICATIONS

Translation of JP (2011-158057).*
(Continued)

*Primary Examiner* — Marcus Charles
(74) *Attorney, Agent, or Firm* — Noah A. Tevis

(57) ABSTRACT

A bearing can include a ball member, a race, and a liner located on an interior surface of the race, the liner having a first surface bonded to an interior surface of the race, the liner having a second surface that is adjacent to the ball member. The bearing also includes a wafer having a wear surface that is aligned with the second surface of the liner, the wafer being an electrically conductive member. Operational wear of the liner can be calculated by comparing a measured resistance of the wafer to an original known resistance of the wafer.

15 Claims, 7 Drawing Sheets

(56) References Cited

U.S. PATENT DOCUMENTS

| | | | |
|---|---|---|---|
| 5,904,426 A * | 5/1999 | Tsuru et al. | 384/909 |
| 6,902,341 B1 * | 6/2005 | Rauschert | 403/301 |
| 7,456,643 B2 * | 11/2008 | Johnson | 324/756.03 |
| 7,503,697 B2 * | 3/2009 | Tsuji et al. | 384/476 |
| 7,520,691 B2 * | 4/2009 | Dearing et al. | 403/135 |
| 7,568,841 B2 * | 8/2009 | Wood et al. | 384/209 |
| 8,529,136 B2 * | 9/2013 | Liu et al. | 384/492 |
| 2004/0247214 A1 * | 12/2004 | Boshier et al. | 384/206 |
| 2008/0031559 A1 * | 2/2008 | Bhatt et al. | 384/492 |
| 2009/0290822 A1 * | 11/2009 | Wilson et al. | 384/206 |

FOREIGN PATENT DOCUMENTS

| | | | |
|---|---|---|---|
| EP | 2610168 A1 | | 7/2013 |
| GB | 2384278 A | * | 7/2003 |
| JP | S566911 A | | 1/1981 |
| JP | 2007107608 A | * | 4/2007 |
| JP | 2011158057 A | | 8/2011 |

OTHER PUBLICATIONS

European Search Report in related European Application No. 14150078.5, dated May 8, 2014, 3 pages.

European Search Report in related European Application No. 14150078.5, dated May 20, 2014, 5 pages.

Canadian Office Action in related Canadian Application No. 2,865,134, dated Jul. 9, 2015, 4 pages.

* cited by examiner

SYSTEM AND METHOD OF MONITORING WEAR IN A BEARING

BACKGROUND

1. Technical Field

The present disclosure relates to a system and method for monitoring wear in a bearing.

2. Description of Related Art

Bearings can be used in a wide variety of implementations. One conventional implementation is the use of a rod end bearing in a rotor system of a helicopter. The rod end can have a liner between the ball and the race in order to reduce friction therebetween. Over time, the liner can wear away and necessitate replacement of the bearing. Conventionally, the amount of wear is detected by applying a load and measuring the amount of relative motion between the ball and the race of the bearing. This process is labor intensive, inaccurate, and can require special procedures and equipment to perform.

There is a need for an improved system and method of monitoring wear in a bearing.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
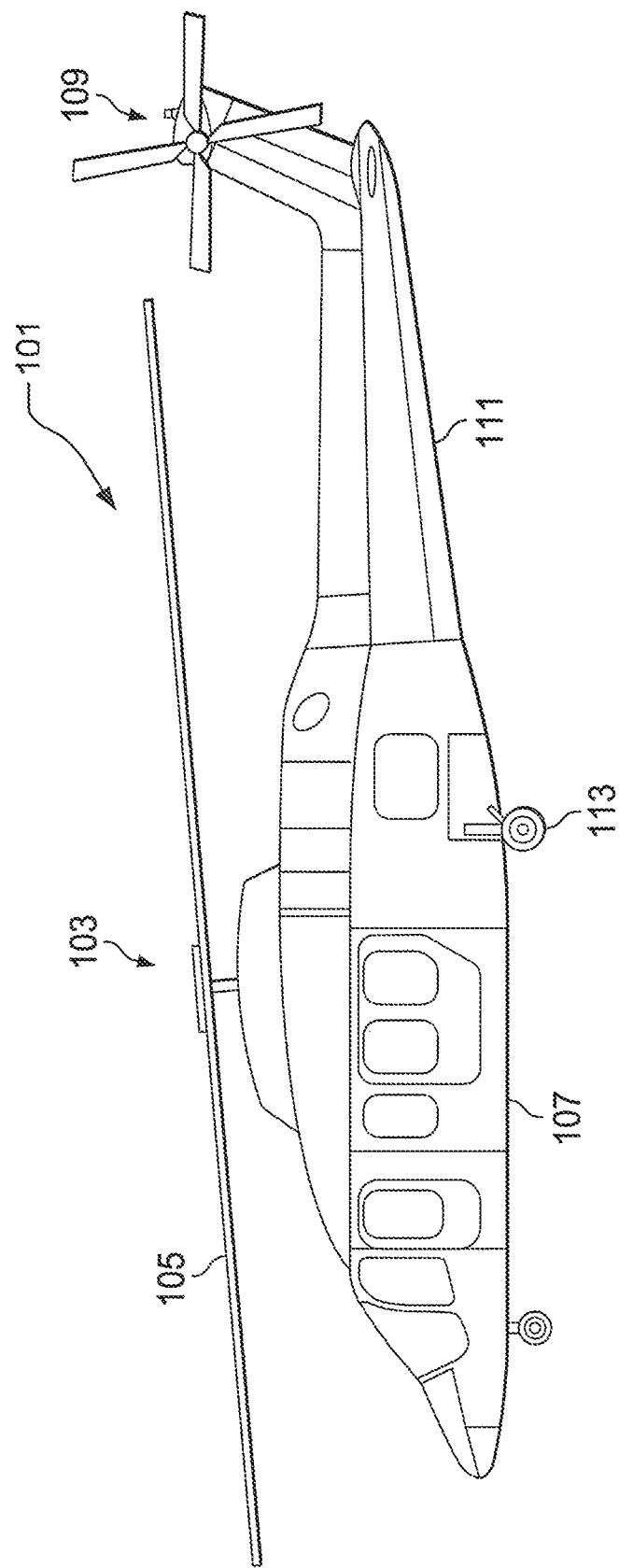
FIG. 1 is a side view of a rotorcraft, according to an example embodiment.

Referring now to FIG. 1 in the drawings, a rotorcraft 101 is illustrated. Rotorcraft 101 has a rotor system 103 with a plurality of rotor blades 105. The pitch of each rotor blade 105 can be selectively controlled in order to selectively control direction, thrust, and lift of rotorcraft 101. Rotorcraft 101 further includes a fuselage 107, anti-torque system 109, and an empennage 111. Rotorcraft 101 further includes a landing gear system 113 to provide ground support for the aircraft. It should be appreciated that rotorcraft 101 is merely illustrative of a variety of aircraft that can implement the embodiments disclosed herein. Other aircraft implementations can include hybrid aircraft, tilt rotor aircraft, unmanned aircraft, gyrocopters, and a variety of helicopter configurations, to name a few examples. It should be appreciated that even though aircraft are particularly well suited to implement the embodiments of the present disclosure, non-aircraft vehicles and devices can also implement the embodiments.

Figure 2:
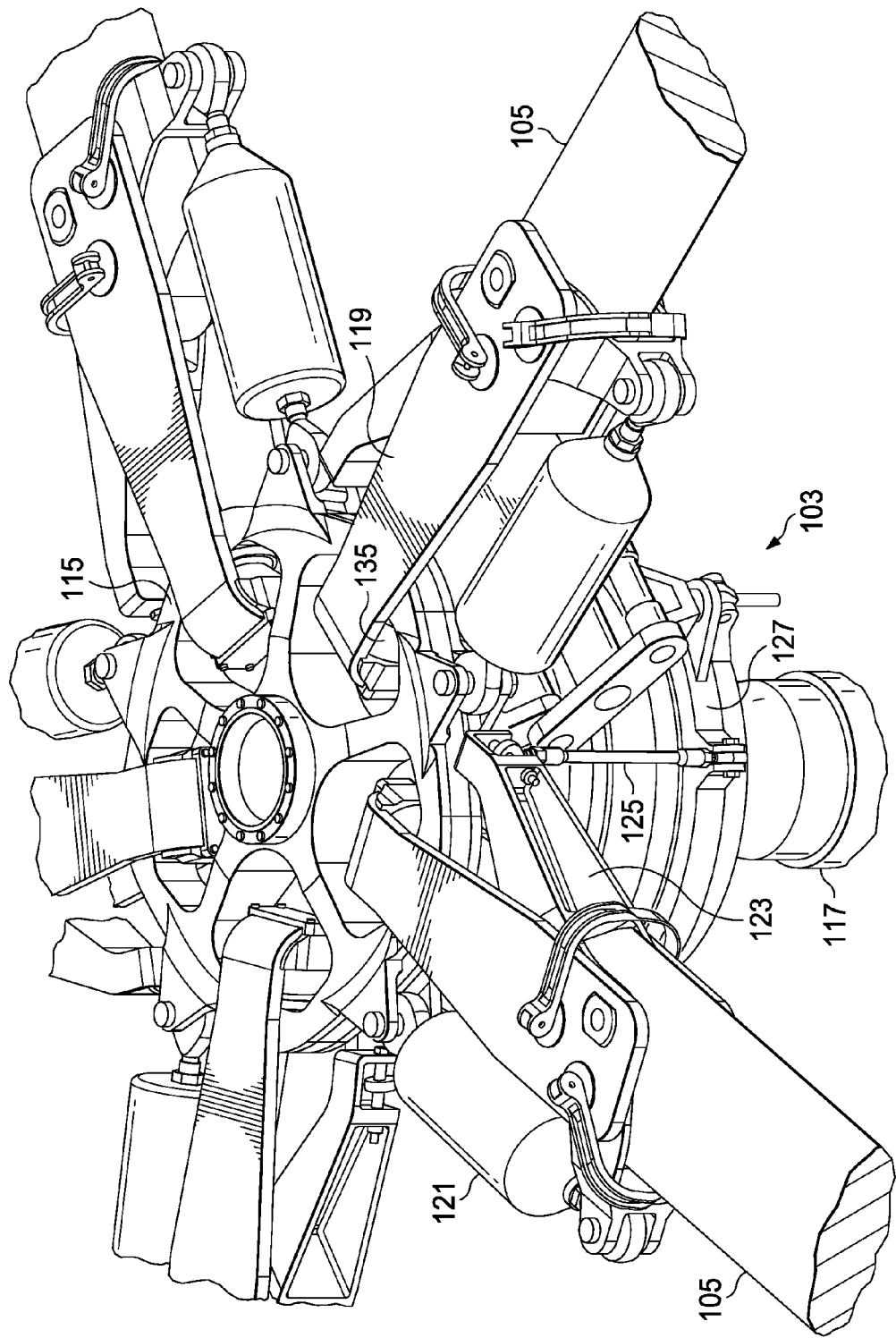
FIG. 2 is perspective view of the rotor hub of the rotorcraft, according to an example embodiment.

Referring also to FIG. 2 in the drawings, rotor hub 103 is illustrated in further detail. Rotor hub 103 includes a yoke 109 coupled to a mast 117. Each rotor blade 105 is coupled to the yoke 115 with a grip 119. An inboard portion of each grip 119 is secured within an opening of the yoke 115 with a centrifugal force bearing 135. Rotor blade 105 is attached to the outboard portion of grip 119. A pitch horn 123 is interposed between rotor blade 105 and grip 119. A damper 121 is attached between yoke 115 and pitch horn 123. A pitch link 125 transfers pitch changes from a swashplate 127 to pitch horn 123. During operation, pitch link 125 can endure a high frequency of cycles.

Figure 3:
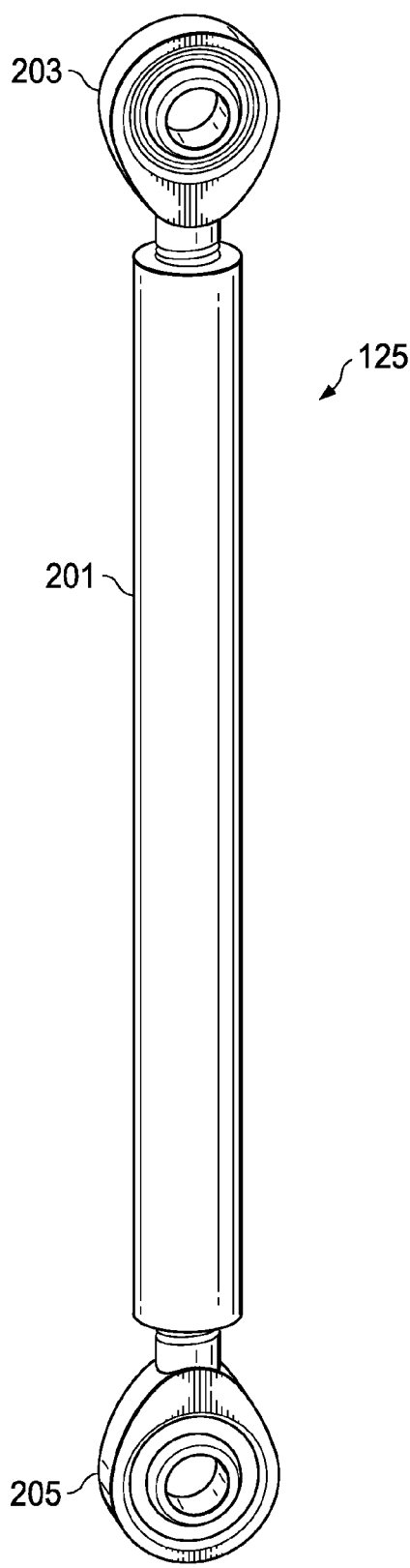
FIG. 3 is a perspective view of a pitch link, according to an example embodiment.
Figure 4:
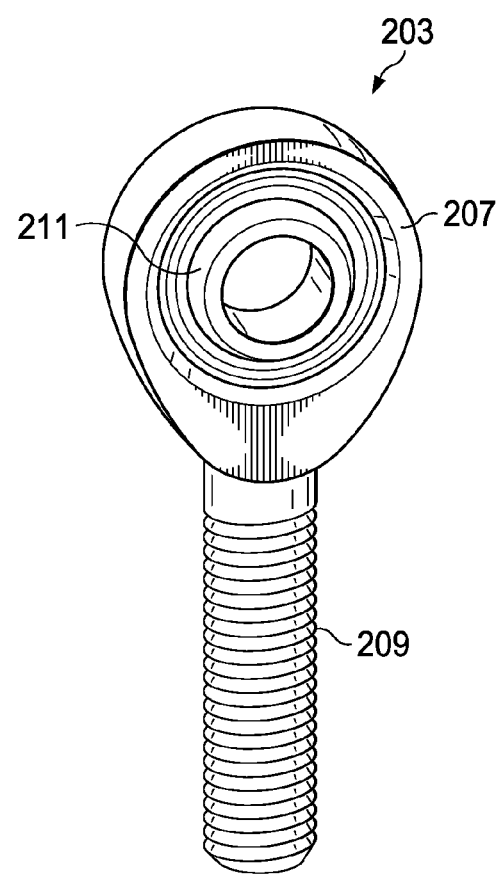
FIG. 4 is a perspective view of a rod end having a spherical bearing, according to an example embodiment.
Figure 5:
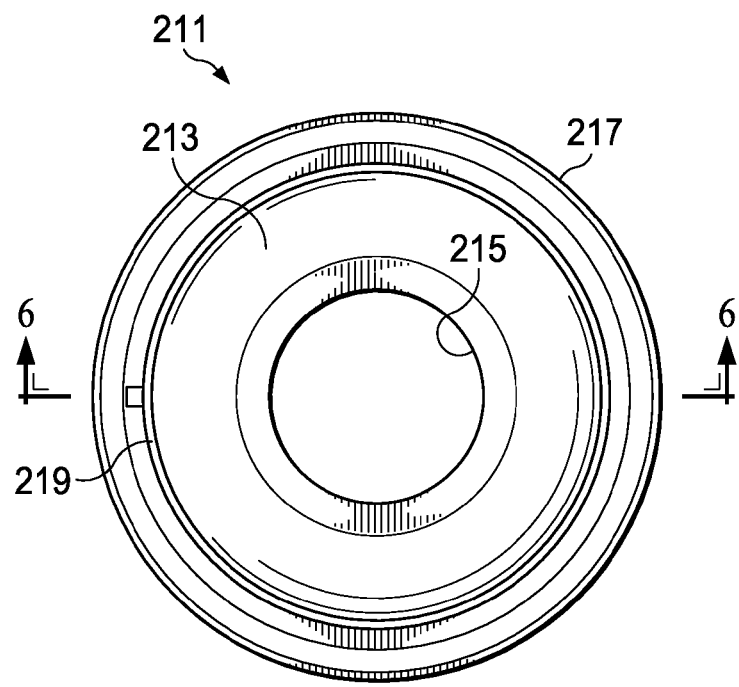
FIG. 5 is a side view of a bearing, according to an example embodiment.
Figure 6:
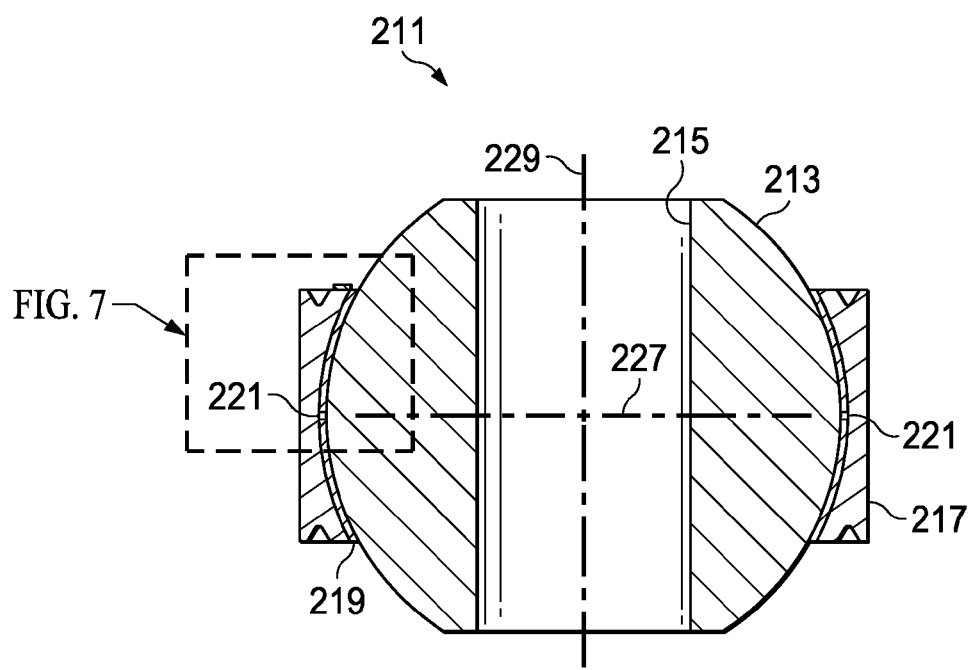
FIG. 6 is a cross-sectional view of the bearing, taken from section lines 6-6 in FIG. 5, according to an example embodiment.
Figure 7:
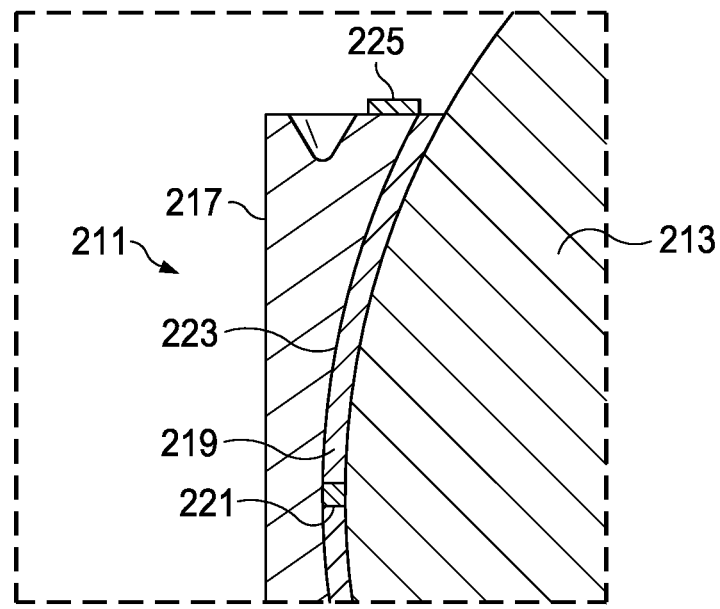
FIG. 7 is a detail view of the bearing, according to an example embodiment.
Figure 8:
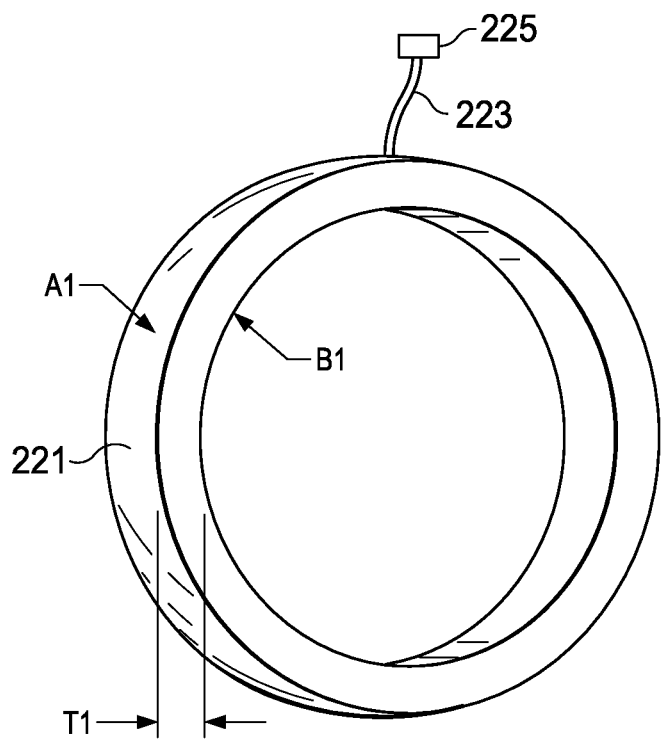
FIG. 8 is a perspective view of a wafer, according to an example embodiment.
Figure 9:
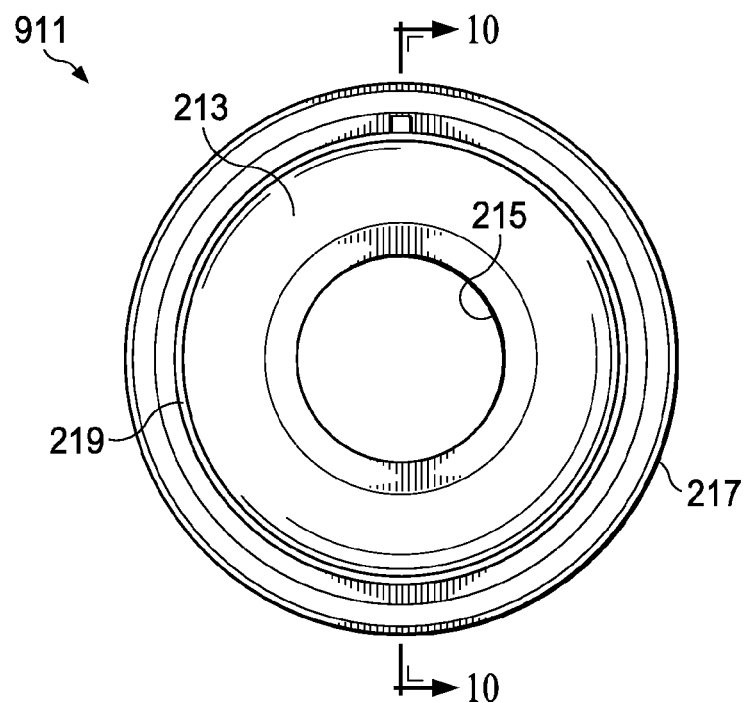
FIG. 9 is a side view of a bearing, according to another example embodiment.
Figure 10:
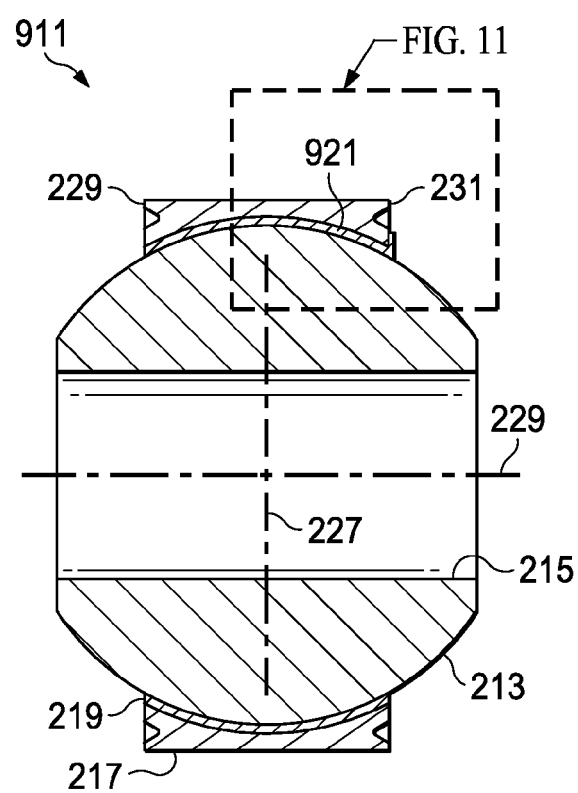
FIG. 10 is a cross-sectional view of the bearing, taken from section lines 10-10 in FIG. 9, according to an example embodiment.
Figure 11:
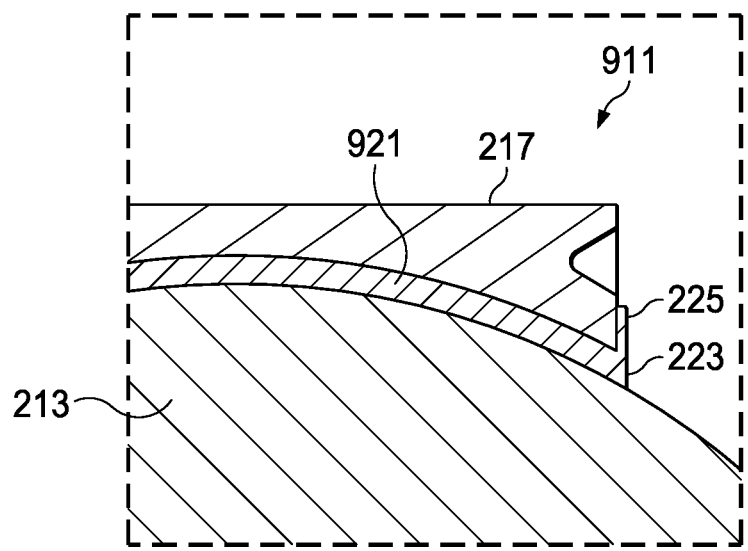
FIG. 11 is a detail view of the bearing, according to an example embodiment.
Figure 12:
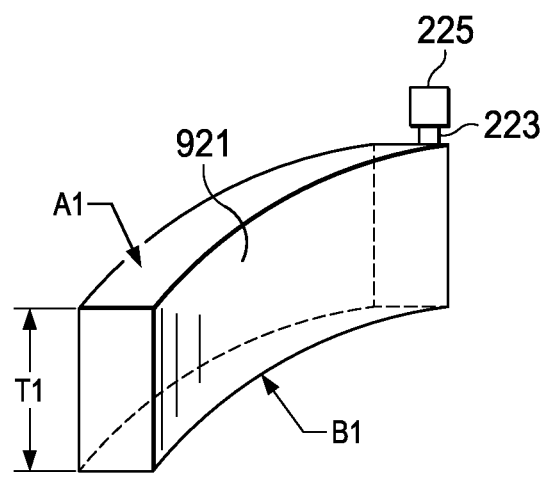
FIG. 12 is a perspective view of a wafer, according to an example embodiment.

Referring now also to FIGS. 3 and 4, pitch link 125 is illustrated in further detail. Pitch link 125 can include a link body 201 coupled between a first rod end 203 and a second rod end 205 that are substantially similar to each other. Rod end 203 can include a housing 207 and a shaft 209. Housing 207 is adapted for securing a bearing 211 therein. In the illustrated embodiment, bearing 211 is swaged into housing 207; however, it should be appreciated that bearing 211 can be coupled into housing 207 in other ways, such as adhesive bonding. In another embodiment, bearing 211 is integral with housing. Bearing 211 is illustrated as a spherical type bearing for exemplary purposes.

Referring now also to FIGS. 5-8, one example embodiment of bearing 211 is illustrated in further detail. Bearing 211 can include ball 213 having an attachment hole 215 located therethrough. Ball 213 fits within a race 217 that has an interior spherical surface with a liner 219 thereon. An outer surface of race 217 has an outer diameter that is configured for securely locating within a component or structure, such as housing 207 of rod end 203, for example. Ball 213 is configured to rotate in relation to liner 219, such that the outer surface of ball 213 rubs against the friction surface of liner 219. Liner 219 is preferably made with a material having a low coefficient of friction, such as polytetrafluoroethylene (PTFE).

Bearing 211 includes a wafer 221 embedded in liner 219. Wafer 221 is an electrically conductive material that has a defined volume with a known electrical resistance. Leads 223 are electrically coupled to both wafer 221 and a terminal 225. Terminal 225 is located at an easily accessible external surface, such as on an outer surface of race 217. Leads 223 can be embedded in liner 219 or located between liner 219 and race 217. A wear surface B1 of wafer 221 is configured to wear as liner 219 wears, while a surface A1 is fixed to the inner surface of race 217. As wear surface B1 is eroded, the thickness T1 between surfaces A1 and B1 is reduced, resulting in a reduction in wafer volume and resistance. In the illustrated embodiment, wafer 221 is approximately ring shaped with an outer radial surface A1 and inner radial surface B1 that are concentric. An axis 227 corresponding with axial loads of pitch link 125 intersects wafer 221 twice. A center of wafer 221 intersects both axis 227 and hole axis 229. A predicted wear pattern will be most severe at the locations at either intersect of axis 227 and wafer 221. The ring geometry of wafer 221 allows bearing 211 to be located in any orientation within housing 207 while maintaining two intersections with axis 227, thus insuring that wafer 221 will be subjected to the most severe wear within the wear pattern, regardless of the orientation of bearing 211 within housing 207.

Wafer 221 and liner 219 can be attached to the interior of race 217 in a number of different methods. One method is to locate and bond wafer 221 around the centerline interior of race 217 prior to injection molding liner 219 adjacently to both sides of wafer 221 onto the interior of race 217.

During operation, wafer 221 is worn at the same rate as liner 219. In order to easily quantify the amount of wear of liner 219, an Ohm meter can be coupled to leads 223 at terminal 225 to measure the resistance of wafer 221. The measured resistance can be compared to an initial or pre-worn resistance in order to calculate a wear percentage of wafer 221, which corresponds to a wear percentage of liner 219. In another embodiment, leads 223 are electrically coupled to a monitoring system in the aircraft such that the wear percentage of wafer 221 and liner 219 can be accessed and read on a display within the aircraft. In another embodiment, the resistance measurement of wafer 221 is wirelessly transmitted to a receiver to avoid the time and effort associated with manually coupling an Ohm meter to terminal 225. However it should be appreciated that even manually coupling an Ohm meter to terminal 225 to calculate a percentage of wear of liner 219 is much more accurate and efficient compared with the conventional methods of testing for wear of liner 219.

Referring now also to FIGS. 9-12, another embodiment of bearing 211 is illustrated. Bearing 911 illustrated in FIGS. 9-12 is substantially similar in form and function as the bearing 211 illustrated in FIGS. 5-8, except for the geometry and location of wafer 921. As illustrated in FIGS. 9-12, the geometry of wafer 921 can be such that the lengthwise axis of wafer 921 extends from a first face 229 to a second face 231 of race 217. The wafer 921 intersects axis 227, axis 227 corresponding with an axial load path of pitch link 125. Thus wafer 921 has an arc shaped volume extends from first face 229 to second face 231 rather than being a ring shaped member similar to wafer 221.

The embodiments herein are illustrated with regard to a pitch link on a main rotor assembly on a rotorcraft; however, it should be appreciated that the embodiments may be adaptable to any bearing and structure incorporating such a bearing. For example, bearings 211 and 911 can be incorporated into a swashplate drive link, anti-drive link, control link, tail rotor pitch link, and lined journal bearings, to name a few examples.

The particular embodiments disclosed above are illustrative only, as the apparatus may be modified and practiced in different but equivalent manners apparent to those skilled in the art having the benefit of the teachings herein. Modifications, additions, or omissions may be made to the apparatuses described herein without departing from the scope of the invention. The components of the apparatus may be integrated or separated. Moreover, the operations of the apparatus may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A bearing, comprising:
   a ball member;
   a race;
   a liner located on an interior surface of the race, the liner having a first surface bonded to an interior surface of the race, the liner having a second surface that is adjacent to the ball member; and
   a wafer having a wear surface that is aligned with the second surface of the liner, the wafer being an electrically conductive member with an initial resistance;
   wherein a wear inducing operation causes the wafer to wear along with the liner, thus causing a decrease of the initial resistance such that an amount of the decrease of the initial resistance is indicative of an amount of wear of the liner.

2. The bearing according to claim 1, wherein the ball member has a hole located therethrough.

3. The bearing according to claim 1, further comprising:
   a first lead and second lead electrically coupled to the wafer.

4. The bearing according to claim 3, further comprising:
   a terminal coupled to the first lead and the second lead.

5. The bearing according to claim 4, wherein the terminal is located on an exposed surface of the bearing.

6. The bearing according to claim 4, wherein the terminal is located on an exposed surface of the race.

7. The bearing according to claim 1, wherein the liner includes a polytetrafluoroethylene material.

8. The bearing according to claim 1, wherein the wafer is a ring shaped member that is concentric with a centerline axis of the race.

9. The bearing according to claim 1, wherein the wafer is an arc shaped member that extends from a first face of the race to a second face of the race.

10. The bearing according to claim 1, wherein the wafer is an arc shaped member that intersects an axial load path axis of the bearing.

11. The bearing according to claim 1, wherein the race is configured to be attached to a structure.

12. The bearing according to claim 11, wherein the structure is a rod end.

13. A pitch link for an aircraft, the pitch link comprising:
   a body member;
   a rod end coupled to the body member, the rod end comprising:
      a ball member;
      a race;
      a liner located on an interior surface of the race, the liner having a first surface bonded to an interior surface of the race, the liner having a second surface that is adjacent to the ball member; and
      a wafer having a wear surface that is aligned with the second surface of the liner, the wafer being an electrically conductive member;
      a first lead and second lead electrically coupled to the wafer;
      wherein the first lead and the second lead are coupled to wear a monitoring system within the aircraft.

14. The pitch link according to claim 13, further comprising:
   a terminal coupled to the first lead and the second lead.

15. The pitch link according to claim 13, wherein the first lead and the second lead are also coupled to a wireless transmitting device.

\* \* \* \* \*